(12) United States Patent
Shain et al.

(10) Patent No.: US 9,495,292 B1
(45) Date of Patent: Nov. 15, 2016

(54) CACHE MANAGEMENT

(71) Applicant: EMC Corporation, Hopkinton, MA (US)

(72) Inventors: Randall H. Shain, Wrentham, MA (US); Roy E. Clark, Hopkinton, MA (US); Alexandr Veprinsky, Brookline, MA (US); Arieh Don, Newton, MA (US); Philip Derbeko, Modiin (IL); Yaron Dar, Sudbury, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 352 days.

(21) Appl. No.: 14/145,294

(22) Filed: Dec. 31, 2013

(51) Int. Cl.
*G06F 12/08* (2016.01)

(52) U.S. Cl.
CPC ................... *G06F 12/0802* (2013.01)

(58) Field of Classification Search
CPC ...................................... G06F 12/0802
USPC ........................... 711/118, 154, 156
See application file for complete search history.

(56) References Cited

U.S. PATENT DOCUMENTS

| | | | | |
|---|---|---|---|---|
| 6,792,507 B2 * | 9/2004 | Chiou | ................. | G06F 12/0813 711/119 |
| 7,117,310 B2 * | 10/2006 | Chatterjee | ............. | G06F 11/201 710/53 |
| 7,516,189 B2 * | 4/2009 | Ookubo | ................. | H04L 12/66 707/999.201 |
| 8,024,525 B2 * | 9/2011 | Willis | ................. | G06F 11/1441 711/135 |
| 8,261,036 B2 * | 9/2012 | Fukatani | ............... | G06F 3/0317 711/165 |
| 8,359,431 B2 * | 1/2013 | Kano | ................... | G06F 3/0613 711/103 |
| 8,495,331 B2 * | 7/2013 | Matsumoto | ........... | G06F 3/0608 711/152 |
| 8,583,883 B2 * | 11/2013 | Fukatani | ............... | G06F 3/0317 711/161 |
| 8,656,099 B2 * | 2/2014 | Saito | ..................... | G06F 1/3203 711/114 |
| 8,832,498 B1 * | 9/2014 | Jain | .................... | G06F 17/30017 714/25 |
| 8,856,257 B1 * | 10/2014 | Zhang | ................. | G06F 11/0709 709/207 |
| 8,949,395 B2 * | 2/2015 | Atluri | ................. | G06F 11/1453 709/202 |
| 9,009,395 B2 * | 4/2015 | Kano | ..................... | G06F 3/0613 711/103 |
| 9,015,111 B2 * | 4/2015 | Akaike | ............. | G06F 17/30132 707/609 |
| 9,043,639 B2 * | 5/2015 | Barrall | .................. | G06F 3/0607 711/112 |
| 9,104,553 B2 * | 8/2015 | Cleveland | ........... | G06F 12/0246 |
| 2003/0229764 A1 * | 12/2003 | Ohno | ..................... | G06F 3/061 711/147 |
| 2005/0027798 A1 * | 2/2005 | Chiou | ................. | G06F 12/0813 709/203 |
| 2011/0137861 A1 * | 6/2011 | Burnett | ............. | G06F 17/30348 707/622 |

* cited by examiner

Primary Examiner — Stephen Elmore
(74) Attorney, Agent, or Firm — Krishnendu Gupta; Konrad Lee

(57) ABSTRACT

A computer-executable method, system, and computer program product of managing a hierarchical data storage system, wherein the data storage system includes a first level of one or more hosts, a second level of one or more storage appliances, and a data storage array, the computer-executable method, system, and computer program product comprising receiving an I/O request from a first host of the one or more hosts, wherein the I/O request relates to a portion of data on the data storage array, analyzing the I/O request to determine a status of the portion of data on the data storage system, based on the determination, providing an update to a second host of the one or more hosts based on the I/O request, wherein the portion of data is cached on the second host of the one or more hosts, and processing I/O request by sending I/O request to data storage array.

20 Claims, 12 Drawing Sheets

CACHE MANAGEMENT

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, system, and computer program product of managing a hierarchical data storage system, wherein the data storage system includes a first level of one or more hosts, a second level of one or more storage appliances, and a data storage array, the computer-executable method, system, and computer program product comprising receiving an I/O request from a first host of the one or more hosts, wherein the I/O request relates to a portion of data on the data storage array, analyzing the I/O request to determine a status of the portion of data on the data storage system, based on the determination, providing an update to a second host of the one or more hosts based on the I/O request, wherein the portion of data is cached on the second host of the one or more hosts, and processing the I/O request by sending the I/O request to the data storage array.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

System Overview

Figure 1:
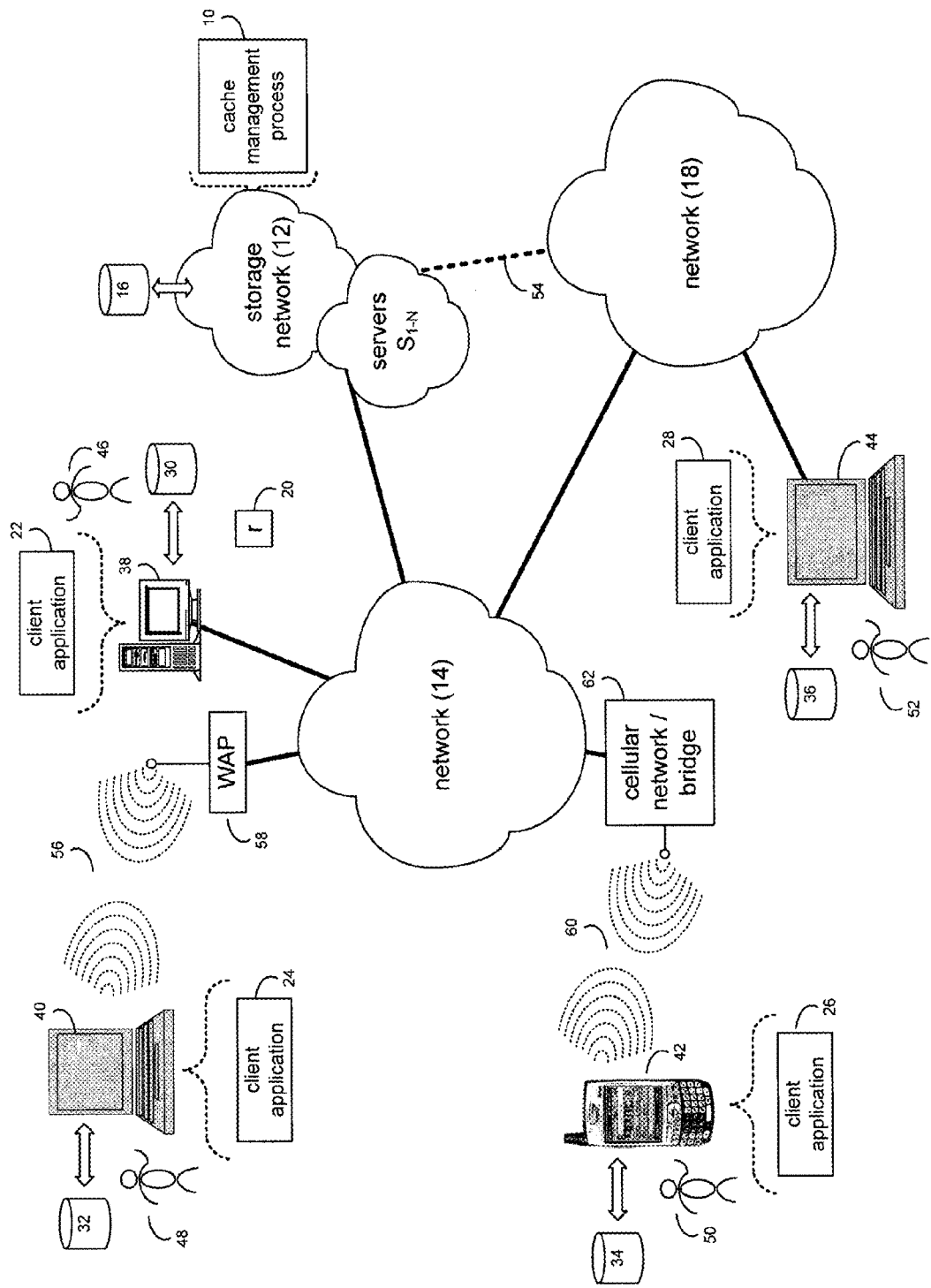
FIG. 1 is a diagrammatic view of a storage network and a cache management process coupled to a distributed computing network, in accordance with an embodiment of the present disclosure.

Referring to FIG. 1, there is shown cache management process 10 that may reside on and may be executed by storage network 12, which may be connected to network 14 (e.g., the Internet or a local area network). Examples of storage network 12 may include, but are not limited to: a Network Attached Storage (NAS) system and a Storage Area Network (SAN). As will be discussed below in greater detail, a SAN may include one or more of a personal computer, a server computer, a series of server computers, a mini computer, a mainframe computer, a RAID array and an NAS. The various components of storage network 12 may execute one or more operating systems, examples of which may include but are not limited to: Microsoft Windows XP Server™; Novell Netware™; Redhat Linux™, Unix, or a custom operating system, for example.

As will be discussed below in greater detail, cache management process 10 may receive an indication of a data portion update within an electromechanical storage system. Information concerning the data portion update may be provided to at least one proprietary, solid-state, non-volatile, cache memory system. The proprietary, solid-state, non-volatile, cache memory system may be associated with at least a first of a plurality of computing devices and may not be associated with at least a second of the plurality of computing devices.

The instruction sets and subroutines of cache management process 10, which may be stored on storage device 16 included within storage network 12, may be executed by one or more processors (not shown) and one or more memory architectures (not shown) included within storage network 12. Storage device 16 may include but is not limited to: a hard disk drive; a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage network 12. Examples of data request 20 may include but are not limited to data write requests (i.e. a request that a data segment be written to storage network 12) and data read requests (i.e. a request that a data segment be read from storage network 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage network 12 directly through network 14 or through secondary network 18. Further, storage network 12 may be connected to network 14 through secondary network 18, as illustrated with link line 54 (shown in phantom).

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

The Cache Management Process:

For the following discussion, client application 22 is going to be described for illustrative purposes. However, this is not intended to be a limitation of this disclosure, as other client applications (e.g., client applications 24, 26, 28) may be equally utilized.

Figure 2:
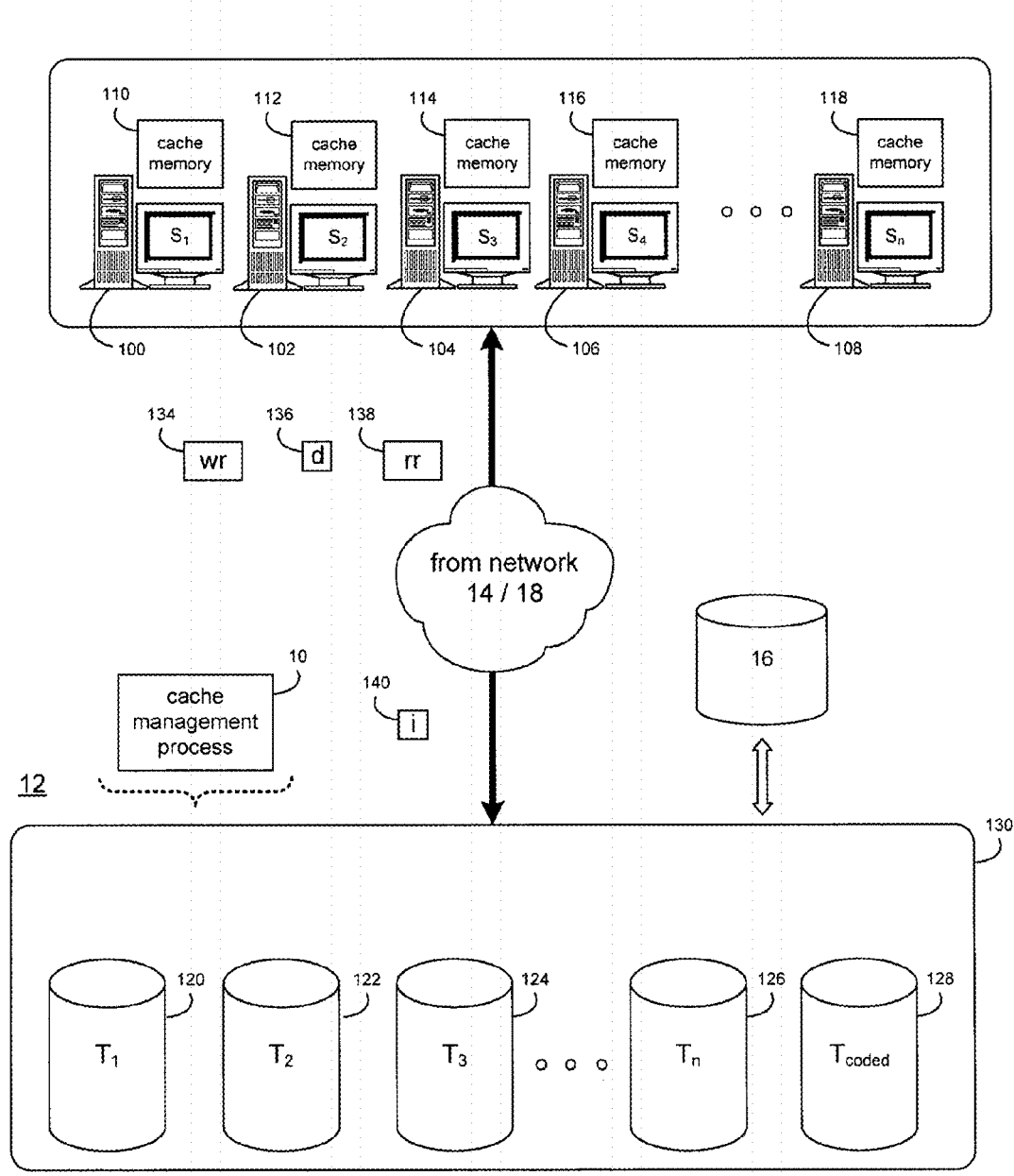
FIG. 2 is a diagrammatic view of the storage network of FIG. 1, in accordance with an embodiment of the present disclosure.

Referring also to FIG. 2, a plurality of server computers $S_{1-n}$ (e.g., server computers 100, 102, 104, 106, 108) may be coupled to network 14 and/or network 18. Server computers 100, 102, 104, 106, 108 may be coupled to network 14 and/or network 18 via e.g., a wireless connection or a hardwired connection. Server computers 100, 102, 104, 106, 108 may include a device that may perform the function of a server computer, example of which may include but are not limited to: freestanding server computers, desktop computers, workstation computers, and rackmount computers. Server computers 100, 102, 104, 106, 108 may execute one or more operating systems, examples of which may include but are not limited to: Microsoft Windows XP Server™; Novell Netware™; Redhat Linux™, Unix, or a custom operating system, for example.

While in this particular example, the plurality of server computers is shown to be five server computers (e.g. server computers 100, 102, 104, 106, 108); this is for illustrative purposes only and is not intended to be a limitation of this disclosure. Specifically, the actual number of server computers may be increased or decreased depending upon e.g. the level of redundancy/performance/capacity required.

Server computers 100, 102, 104, 106, 108 may each be coupled to a proprietary cache memory system (e.g., proprietary cache memory systems 110, 112, 114, 116, 118, respectively). Examples of proprietary cache memory systems 110, 112, 114, 116, 118 may include but are not limited to: flash-based, non-volatile, solid-state, cache memory systems. These proprietary cache memory systems may be incorporated within a server computer or external to a server computer. For example, if incorporated into a server computer, a proprietary cache memory system may be mounted to the system board of the server computer. Alternatively, the proprietary cache memory systems may be included within an accessory card (e.g., a PCI card) installed within the server computer. If mounted external to a server computer, the proprietary cache memory system may be directly coupled to the server computer system via e.g., a high-speed USB or FireWire port. Alternatively, the proprietary cache memory system may be remotely coupled to a server computer via e.g., a copper or fiber network connection. Additionally, while proprietary cache memory systems 110, 112, 114, 116, 118 are shown as discrete systems, this is for illustrative purposes only and is not intended to be a limitation of this disclosure, as other configurations are possible. For example, proprietary cache memory systems 110, 112, 114, 116, 118 may be housed in a single network-accessible enclosure, thus enabling proprietary cache memory systems 110, 112, 114, 116, 118 to share a power supply and network connection.

Typically, proprietary cache memory systems 110, 112, 114, 116, 118 are configured so that each proprietary cache memory system 110, 112, 114, 116, 118 is accessible by only a single computer. For example, proprietary cache memory system 110 may be configured to only be accessible by server computer 100; proprietary cache memory system 112 may be configured to only be accessible by server computer 102; proprietary cache memory system 114 may be configured to only be accessible by server computer 104; proprietary cache memory system 116 may be configured to only be accessible by server computer 106; and proprietary cache memory system 108 may be configured to only be accessible by server computer 108. However, other configurations are possible and are considered to be within the scope of this disclosure. For example, one or more of proprietary cache memory systems 110, 112, 114, 116, 118 may be configured so that they are accessible by multiple servers. For example, five proprietary cache memory systems may be configured to service ten server computers, wherein each of the five proprietary cache memory systems is accessible by two of the server computers.

Storage network 12 may include a plurality of storage targets $T_{1-n}$ (e.g. storage targets 120, 122, 124, 126). Storage targets 120, 122, 124, 126 may be configured to provide various levels of performance and/or high availability. For example, one or more of storage targets 120, 122, 124, 126 may be configured as a RAID 0 array, in which data is striped across storage targets. By striping data across a plurality of storage targets, improved performance may be realized. However, RAID 0 arrays do not provide a level of high availability. Additionally/alternatively, one or more of storage targets 120, 122, 124, 126 may be configured as a RAID 1 array, in which data is mirrored between storage targets. By mirroring data between storage targets, a level of high availability is achieved as multiple copies of the data are stored within storage network 12.

While in this particular example, storage network 12 is shown to include four storage targets (e.g. storage targets 120, 122, 124, 126), this is for illustrative purposes only and is not intended to be a limitation of this disclosure. Specifically, the actual number of storage targets may be increased or decreased depending upon e.g. the level of redundancy/performance/capacity required.

Storage network 12 may also include one or more coded targets 128. As is known in the art, a coded target may be used to store coded data that may allow for the regeneration of data lost/corrupted on one or more of storage targets 120, 122, 124, 126. An example of such a coded target may include but is not limited to a hard disk drive that is used to store parity data within a RAID array.

While in this particular example, storage network 12 is shown to include one coded target (e.g., coded target 128), this is for illustrative purposes only and is not intended to be a limitation of this disclosure. Specifically, the actual number of coded targets may be increased or decreased depending upon e.g. the level of redundancy/performance/capacity required.

A combination of storage targets 120, 122, 124, 126 and coded target 128 may form non-volatile, electromechanical memory system 130.

The manner in which storage network 12 is implemented may vary depending upon e.g. the level of redundancy/performance/capacity required. For example, storage network 12 may be a RAID device and storage targets 120, 122, 124, 126 and/or coded target 128 are individual "hot-swappable" hard disk drives. An example of such a RAID device may include but is not limited to an NAS device. Alternatively, storage network 12 may be configured as a SAN, in which each of storage targets 120, 122, 124, 126 and/or coded target 128 may be a RAID device and/or computer-based hard disk drive. Further still, one or more of storage targets 120, 122, 124, 126 and/or coded target 128 may be a SAN.

In the event that storage network 12 is configured as a SAN, the various components of storage network 12 may be coupled using a network infrastructure (e.g., network 14 and/or network 18), examples of which may include but are not limited to an Ethernet (e.g., Layer 2 or Layer 3) network, a fiber channel network, an InfiniBand network, or any other circuit switched/packet switched network.

Logic (not shown) included within storage network 12 may execute all or a portion of cache management process 10. For example, the instruction sets and subroutines of cache management process 10, which may be stored on a storage device (e.g., storage device 16) coupled to storage network 12, may be executed by one or more processors (not shown) and one or more memory architectures (not shown) included within storage network 12. Storage device 16 may include but is not limited to: a hard disk drive; a tape drive; an optical drive; a RAID device; a random access memory (RAM); and a read-only memory (ROM).

As discussed above, various data requests (e.g. data request 20) may be sent from client applications 22, 24, 26, 28 to storage network 12, and examples of data request 20 may include but are not limited to data write request 134 (i.e. a request that data 136 be written to storage network 12) and data read request 138 (i.e. a request that data extent 136 be read from storage network 12). Additionally/alternatively, these data requests (e.g., data write request 134 and data read request 138) may be generated by one or more of server computers 100, 102, 104, 106, 108 in response to e.g., interactions with client applications 22, 24, 26, 28.

As discussed above and as will be discussed below in greater detail, cache management process 10 may receive an indication of a data portion update within an electromechanical storage system. Information concerning the data portion update may be provided to at least one proprietary, solid-state, non-volatile, cache memory system. The proprietary, solid-state, non-volatile, cache memory system may be associated with at least a first of a plurality of computing devices and may not be associated with at least a second of the plurality of computing devices.

Assume for illustrative purposes that data write request 134 is generated by server computer 100, requesting that data 136 be written to non-volatile, electromechanical memory system 130 at address LBA1000 (i.e., Logical Block Address 1000). For this example, data 136 may represent new data (e.g., data that was not previously written to non-volatile, electromechanical memory system 130) or updated data (e.g., a revised version of data previously written to non-volatile, electromechanical memory system 130).

Figure 3:
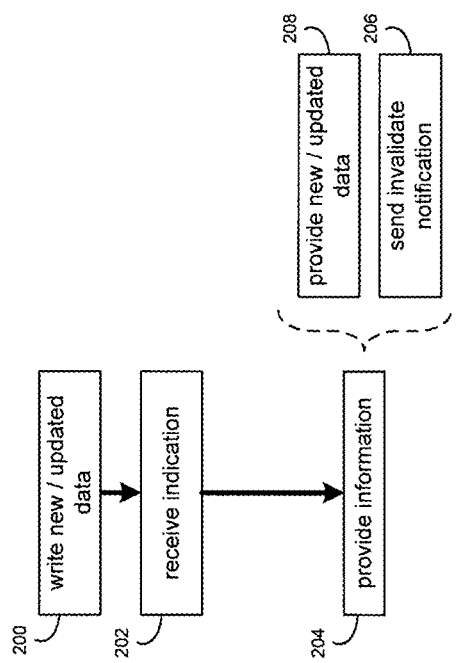
FIG. 3 is a flowchart of a data write process executed by the cache management process of FIG. 1.

Referring also to FIG. 3, server computer 100 may process the LBA1000 address (associated with data 136) to define a target location (e.g., a cache memory page) within proprietary cache memory system 110 for storing data 136. An example of the manner in which server computer 100 may process the LBA1000 address is via a hashing algorithm. Examples of such a hashing algorithm include SHA1 and Simple XOR Address Folding. Server computer 100 may then store data 136 within proprietary cache memory system 110 at the address defined in the manner described above. Additionally, cache management process 10 may store data 136 within non-volatile, electromechanical memory system 130 at the address LBA1000.

While the following discussion concerns data 136 being received by server computer 100 and written to proprietary cache memory system 110, this is for illustrative purposes only and is not intended to be a limitation of this disclosure, as other configurations are possible. For example, data 136 may be received by any of the server computers and, therefore, stored within any of the proprietary cache memory systems.

Upon receiving 202 an indication of the receipt of data 136 for storage within non-volatile, electromechanical memory system 130, cache management process 10 may provide 204 information 140 concerning the receipt of data 136 to one or more of proprietary cache memory systems 110, 112, 114, 116, 118.

Specifically, as each of proprietary cache memory systems 110, 112, 114, 116, 118 provides caching services for the same non-volatile, electromechanical memory system 130, cache management process 10 may provide 204 information 140 concerning the receipt of data 136 for storage within non-volatile, electromechanical memory system 130 to (in this example) cache memory systems 112, 114, 116, 118. Assume for illustrative purposes that data 136 is updated data (e.g., a revised version of data previously written to non-volatile, electromechanical memory system 130). Accordingly, assume that an older version of data 136 had been previously written to non-volatile, electromechanical memory system 130. Further, assume that each of server computers 100, 102, 104, 106, 108 accessed this older version of data 136 and, therefore, has a copy of the older version of data 136 resident in the respective proprietary cache memory systems 110, 112, 114, 116, 118. Additionally, assume that an application accessed the older version of data 136 via server computer 100 and this older version of data 136 was revised and saved by server computer 100.

Accordingly and as discussed above, server computer 100 may store the revised version of data 136 within proprietary cache memory system 110 at an address calculated in the manner described above (e.g., with a hashing algorithm). Further, cache management process 10 may store the revised version of data 136 at address LBA1000 within non-volatile, electromechanical memory system 130. Accordingly, proprietary cache memory system 110 and non-volatile, electromechanical memory system 130 would each have the revised version of data 136. Unfortunately, proprietary cache memory systems 112, 114, 116, 118 would each have the older version of data 136.

Accordingly, cache management process 10 may provide 204 information 140 concerning the receipt and storage of the revised version of data 136 to (in this example) proprietary cache memory systems 112, 114, 116, 118. The information may be provided 204 as a broadcast (simultaneously to all of proprietary cache memory systems 112, 114, 116, 118) or a plurality of unicasts (individually to each of proprietary cache memory systems 112, 114, 116, 118.

When providing 204 information 140, cache management process 10 may send 206 an invalidate notification concerning the data stored at non-volatile, electromechanical memory system 130. Specifically and for the reasons discussed above, the version of data 136 stored within proprietary cache memory systems 112, 114, 116, 118 is invalid, in that it represents an older version of data 136 (as opposed to the updated version of data 136 stored within proprietary cache memory system 110 and non-volatile, electromechanical memory system 130. Accordingly, information 140 provided to proprietary cache memory systems 112, 114, 116, 118 may provide notice that the version of data 136 stored within proprietary cache memory systems 112, 114, 116, 118 is invalid (as it is an older version) and that in the event of a read request being made for data 138, the updated version of the data should be obtained from address LBA1000 of non-volatile, electromechanical memory system 130.

Additionally/alternatively, when providing 204 information 140 to proprietary cache memory systems 112, 114, 116, 118, cache management process 10 may be configured to provide 208 the updated version of data 136 to proprietary cache memory systems 112, 114, 116, 118 so that proprietary cache memory systems 112, 114, 116, 118 may be updated to reflect the latest version of data 136. As discussed above, data 136 may be indicative of updated or new data. In the event that data 136 represents new data, the data provided 208 to proprietary cache memory systems 112, 114, 116, 118 would be representative of the new data. Again, cache management process 10 may use the new data to update proprietary cache memory systems 112, 114, 116, 118.

While server computer 100 is described above as processing the LBA1000 address (associated with data 136) to define a target location (e.g., a cache memory page) within proprietary cache memory system 110, this is for illustrative purposes only and is not intended to be a limitation of this disclosure, as other configurations are possible and are consider to be within the scope of this disclosure. For example, cache management process 10 may process the LBA1000 address (associated with data 136) upon receiving 202 the indication of the receipt of data 136 for storage within non-volatile, electromechanical memory system 130. Accordingly, when server computer 100 receives data 136, the data may be temporarily stored (e.g., in a buffer). Upon receiving 202 an indication of the receipt of data 136 for storage within non-volatile, electromechanical memory system 130, cache management process 10 may process the LBA1000 address to define a target location (e.g., a cache memory page) within proprietary cache memory system 110 for storing data 136. When cache management process 10 provides 204 information 140 to proprietary cache memory systems 112, 114, 116, 118, information 140 may also be provided to proprietary cache memory systems 110 and may define the target location (e.g., a cache memory page) within proprietary cache memory system 110 for storing data 136.

Additionally, while server computer 100 is described above as effectuating the storage of data 136 within proprietary cache memory system 110, this is for illustrative purposes only and is not intended to be a limitation of this disclosure, as other configurations are possible. For example, cache management process 10 may be configured to store 200 data 136 within one or more of proprietary cache memory systems 112, 114, 116, 118.

While proprietary cache memory systems 112, 114, 116, 118 are described above as being incorporated into server computers 100, 102, 104, 106, 108 (respectively), this is for illustrative purposes only and is not intended to be a limitation of this disclosure, as other configurations are possible. For example, proprietary cache memory systems may be included within one or more of client electronic devices 38, 40, 42, 44 and may be configured to effectuate the functionality described above.

A number of implementations have been described. Nevertheless, it will be understood that various modifications may be made. Accordingly, other implementations are within the scope of the following claims.

Hierarchical Cache Management

In many embodiments, the current disclosure may enable management of a multi-level server flash cache products which may be enabled to support active/active shared disk clusters where multiple cache-enabled servers, or virtual machines may be enabled to cache data from shared disks. In various embodiments, the current disclosure may enable data management on multiple levels. In certain embodiments, the current disclosure may enable a data management solution that may include a coherency protocol, a cluster membership protocol and a transport protocol that may enable management of a multi-level caching product.

In many embodiments, the current disclosure may enable creation of an I/O management module which may enable management of data caches in a hierarchical data storage system. In various embodiments, each device within a data storage system may include an I/O management module. In certain embodiments, each I/O management module may act as a server for one or more I/O management modules. In some embodiments, each I/O management module may act as a client for one or more I/O management modules. In many embodiments, an I/O management module may be enabled to communicate status of data storage to devices registered at a given I/O management module.

In various embodiments, a hierarchical cache coherency protocol may be enabled to monitor and/or track each access to each shared resource in a data storage system. In certain embodiments, a Hierarchical cache coherency protocol may be enabled to take action on any attempts to update a copy of each shared resource by either invalidating stale copies or by updating each copy in place.

In many embodiments, tracking accesses to a shared resource may be executed through one or more pathways depending on the interconnectivity between each caching node and the shared resource itself. In various embodiments, processor architectures may utilize a snooping mechanism whereby an individual processor controlling independent memory caches may be enabled to monitor, or "snoop," memory access traffic on the interconnect. In certain embodiments, individualized mechanisms may enable independent action to assure that each affected cache may be kept coherent with their respective shared resource.

In many embodiments, a directory-based tracking may be used to maintain cache coherency. In various embodiments, a central database may be used to track all the data in caches that either may not have the ability to snoop operations to/from the shared resource from all access points.

In certain embodiments, once cache coherency may be threatened by an impending access to a shared resource, a data storage system may act by updating a copy of data in place and/or invalidate the copy of data. In other embodiments, where an update in place may be taken, cached copies of a shared resource that may be in danger of becoming out of sync with a shared resource itself may be updated in place to match the new content of the shared resource. In some embodiments, where invalidation may be the action taken, cached copies of shared resources may be marked invalid so that stale content may not be utilized by the accessing entity.

Figure 4:
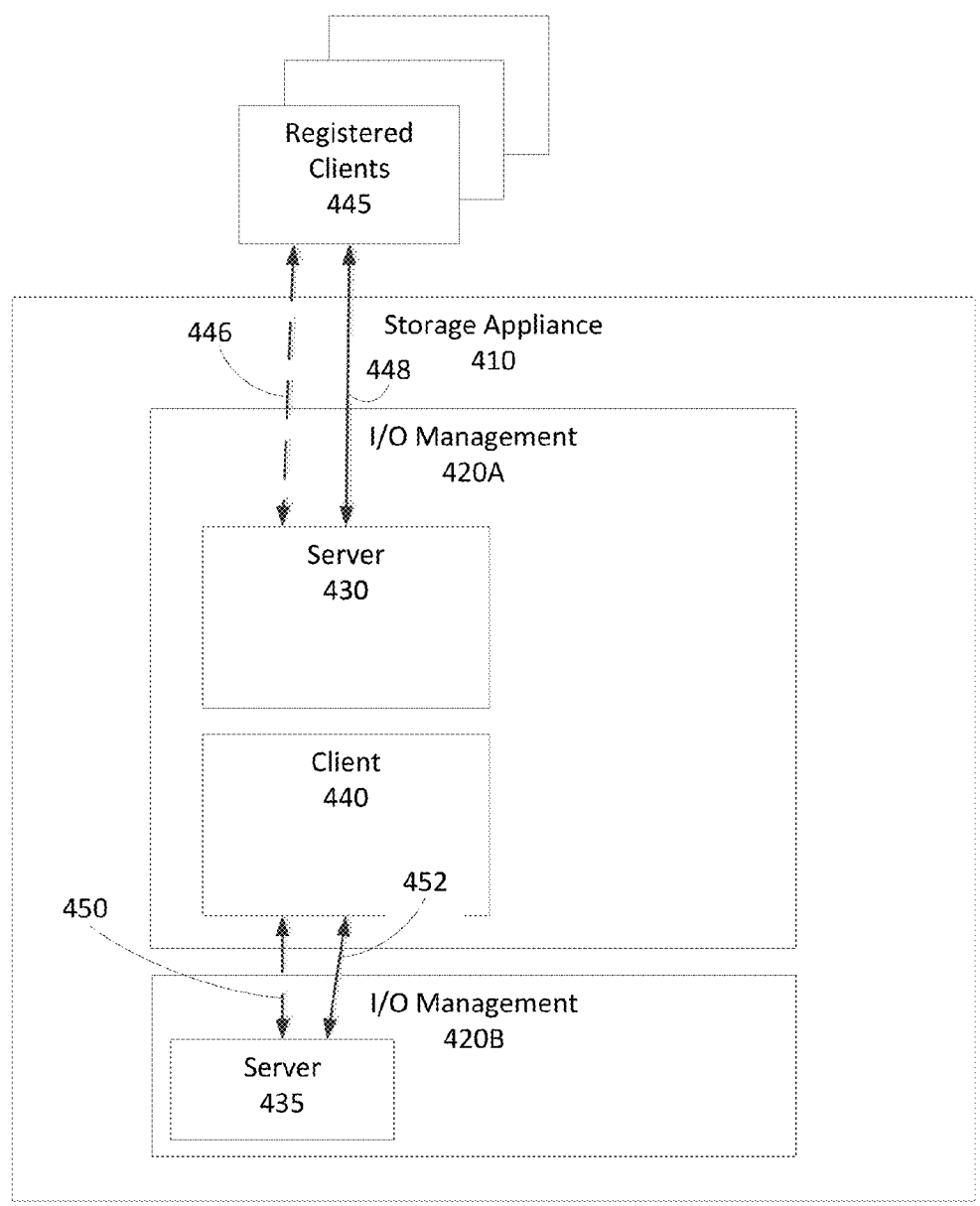
FIG. 4 is a simplified illustration of a device in used in a hierarchical data storage system, in accordance with an embodiment of the present disclosure.

Refer to the example embodiment of FIG. 4. FIG. 4 is a simplified illustration of a device in used in a hierarchical data storage system, in accordance with an embodiment of the present disclosure. As shown, storage appliance 410 is an example of a device used in a hierarchical data storage system. Storage appliance 410 includes I/O management modules 420A and 420B. I/O management module 420A includes server module 430 and client module 440. I/O management module 420B includes only server module 435. In various embodiments, a device in a hierarchical data storage system may include multiple I/O management modules. In certain embodiments, a storage appliance may include one or more I/O management modules to communicate with one or more other I/O management modules included in other storage appliances. In some embodiments, an I/O management module may include a single server only. In certain embodiments, an I/O management module may include a single client only. I/O management modules 420A and 420B are enabled to be used within a hierarchical data storage system to manage cache coherency amongst each device within the hierarchical data storage system. Client module 440 in I/O management module 420A is enabled to register with server module 435 in I/O management module 420B. Server module 435 tracks modifications to data storage containers accessed through I/O management module 420B and sends synchronous notifications to the registered client 440 in I/O management module 420A. Server module 430 is enabled to track data storage containers accessed by registered clients 445 through storage appliance 410 and sends synchronous notifications to registered clients 445. Server module 435 is enabled to send new data from data storage containers to registered client 440 if requested. Server module 430 is enabled to send new data from data storage containers to registered clients 445 if requested. As shown, the dotted lines 446, 450 signify command paths of each component of I/O management modules 420A and I/O management module 420B respectively. Lines 448, 452 signify the data path between each component of I/O management modules 420A and I/O management module 420B respectively.

Figure 5:
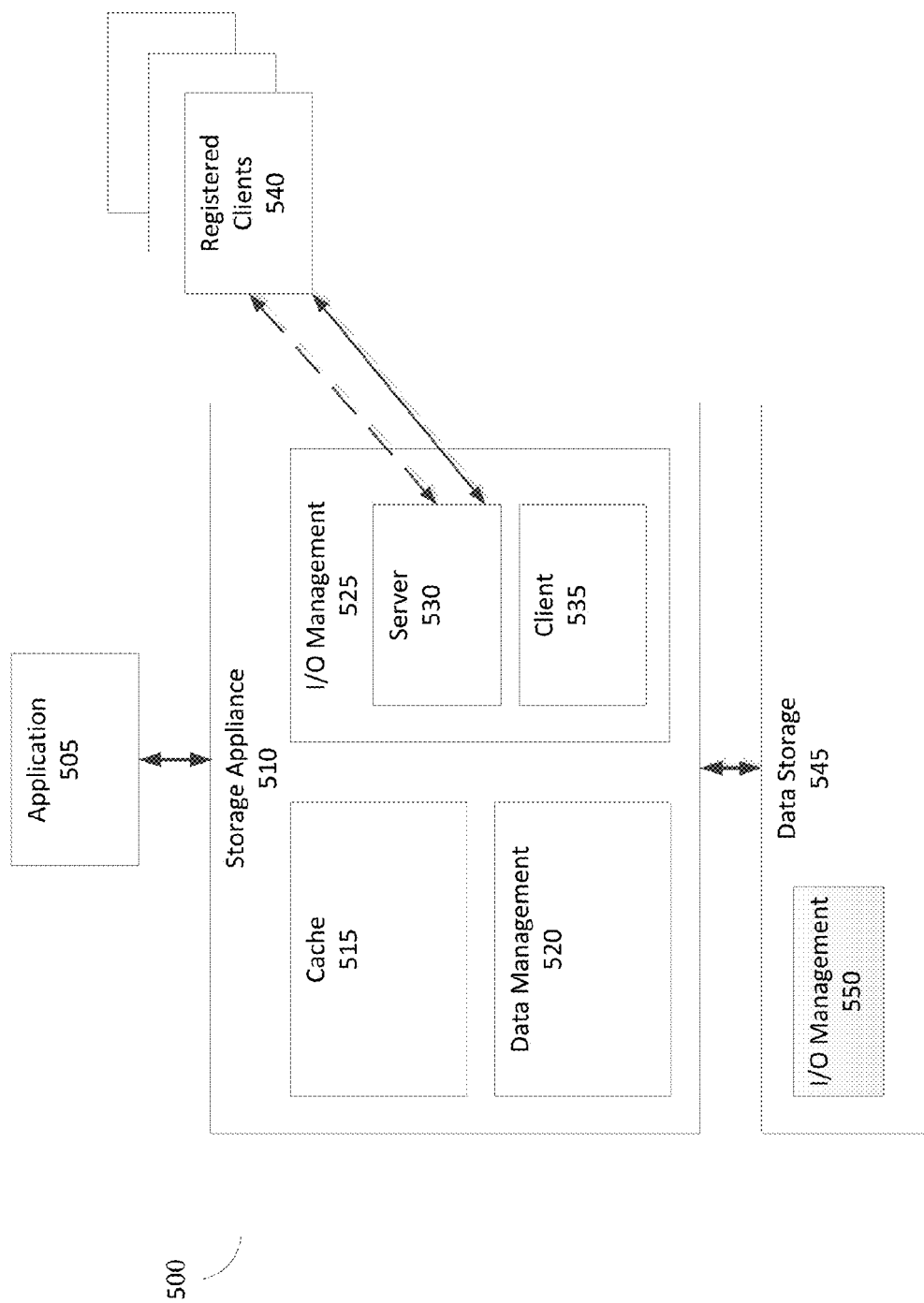
FIG. 5 is a simplified illustration of a hierarchical data storage system, in accordance with an embodiment of the present disclosure.

Refer to the example embodiment of FIG. 5. FIG. 5 is a simplified illustration of a hierarchical data storage system, in accordance with an embodiment of the present disclosure. As shown, hierarchical data storage system 500 includes storage appliance 510 and data storage array 545. Application 505 is executing on storage appliance 510 and utilizing data storage array 545. storage appliance 510 includes I/O management module 525, cache 515, and data management module 520. I/O management module 525 is enabled to create server module 530 and client module 535. Data storage array 545 includes I/O management module 550. In this embodiment, client module 535 is enabled to register with I/O management module to enable I/O management module to be notified when data stored on data storage array 545 is created, modified, and/or deleted. As shown, registered clients 540 are enabled to communicate with server 530 through a command path and a data path.

Figure 6:
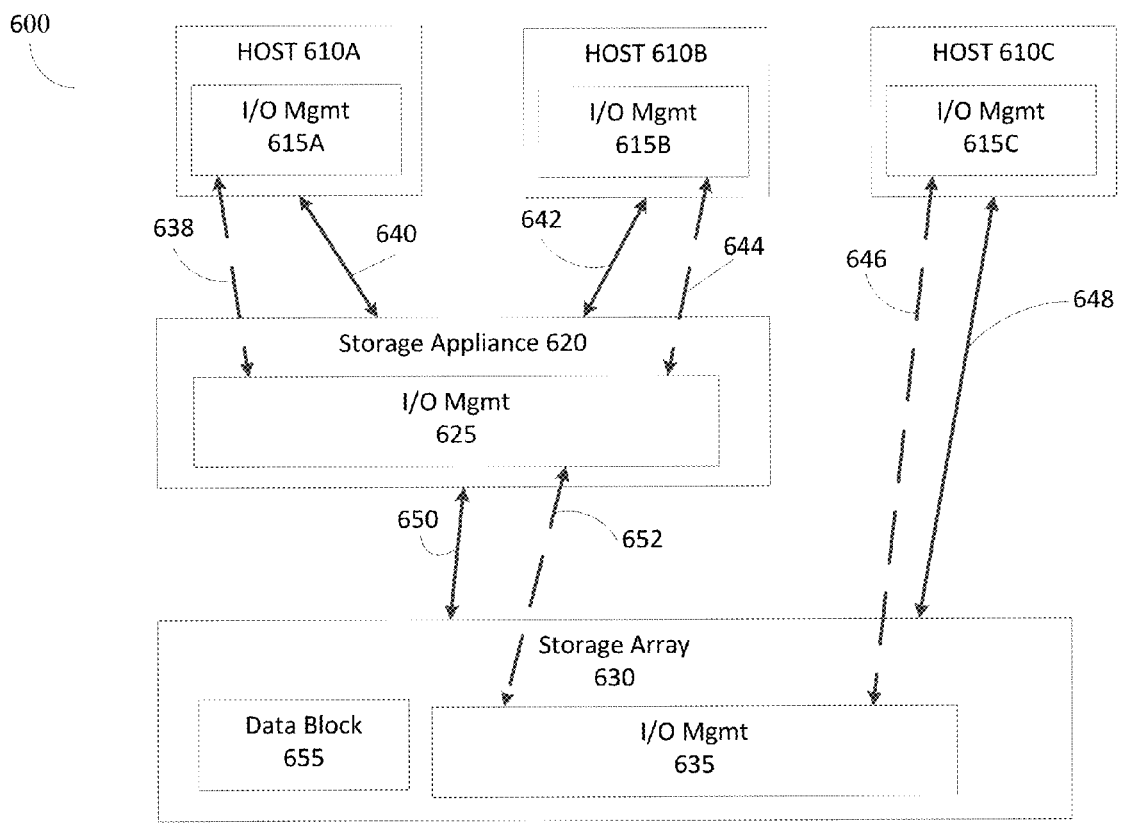
FIG. 6 is a simplified illustration of a hierarchical data storage system, in accordance with an embodiment of the present disclosure.

Refer to the example embodiment of FIG. 6. FIG. 6 is a simplified illustration of a hierarchical data storage system, in accordance with an embodiment of the present disclosure. As shown, hierarchical data storage system (HDSS) 600 includes three levels of data storage devices. Host (610A-C, 610 generally) comprises a first level of HDSS 600. Storage appliance 620 comprises a second level of the HDSS 600. Data storage array 630 comprises a third level of HDSS 600. In this embodiment, each device includes an I/O management module. Host 610A-C includes I/O management modules 615A-C respectively. Storage appliance 620 includes I/O management 625. Data storage array 630 includes I/O management 635 and is storing data block 655. As shown, each I/O management module is enabled to communicate to other I/O management modules through command paths 638, 644, 646, 652. Data is enabled to pass between devices in data storage system 600 using data paths 640, 642, 648, 650.

Each host 610 includes cache and a data management module to manage data on each respective host. Storage appliance 620 includes cache and a data management module to manage data on server 620. Data storage array 630 is comprised of one or more electrical mechanical rotational disk drives enabled to store data. In many embodiments, I/O management modules may be enabled to detect changes in data storage throughout a data storage system and indicate to registered client devices when data cached at a higher level is invalid.

In this embodiment, host 610A and host 610B are in communication with storage appliance 620. Storage appliance 620 is in communication with data storage array 630. I/O management module 615A and I/O management module 615B are in communication with I/O management module 625. I/O management module 625 is in communication with I/O management module 635. Host 610C is in communication with Data storage array 630 and I/O management module 615C is in communication with I/O management module 635.

As shown, data storage system 600 is enabled to maintain cache coherency among each device within data storage system 600. Data block 655 is cached at Host 610A-C and storage appliance 620. If data block 655 is modified by host 610A-C, each I/O management module 615A-C, 625, 635 is enabled to notify registered clients of each respective I/O management module 615A-C, 625, 635. In this embodiment, I/O management module 615A-B are registered with I/O Management module 625. I/O Management module 615C is registered with I/O management module 635. I/O management module 625 is registered with I/O management module 635 and server as a server for I/O module 615A-B. I/O management 635 serves as a server for I/O management module 625 and I/O management Module 615C.

In this embodiment, if host 610A affects data block 655, cache storage on each device in data storage system 600 are notified of the change. I/O management module 625 notifies all registered clients, in this case I/O management module 615, by sending a data invalid notification. I/O management 635 notifies all registered clients, in this case I/O management module 615C, by sending a data invalid notification.

Figure 7:
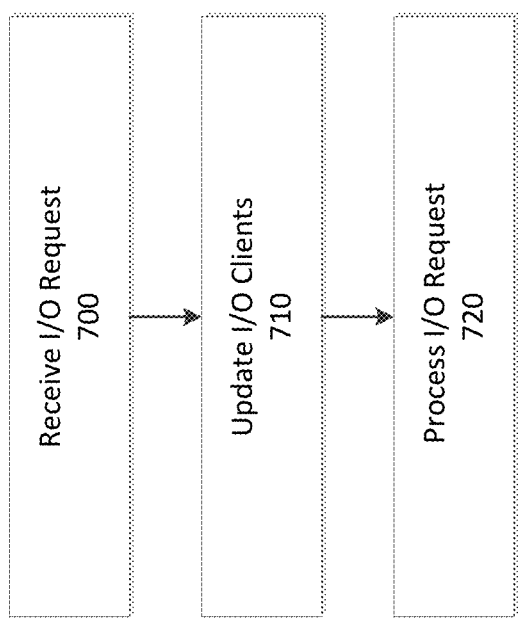
FIG. 7 is a simplified flowchart of a method of managing cache coherency in a data storage system, in accordance with an embodiment of the present disclosure.

Refer to the example embodiment of FIGS. 6 and 7. FIG. 7 is a simplified flowchart of a method of managing cache coherency in a data storage system, in accordance with an embodiment of the present disclosure. As shown, data storage system 600 includes Host 610A, Host 610B, Host 610C, storage appliance 620, and Data storage Array 630. In this embodiment, Host 610A and Host 610C are referencing data block 655. I/O management module 615A is registered with I/O management module 625. I/O management module 615C and I/O management module 625 are registered with I/O management module 635. Data storage array 630 receives I/O request from Host 610C (Step 700). Data storage array 630 updates I/O clients (Step 710) by notifying I/O management module 625 that cached versions of Data Block 655 are invalid. I/O management 625 notifies registered clients, in this case I/O management module 615A, that cached data related to data block 655 are invalid. Upon completing cache coherency process, data storage array 630 processes I/O request from Host 610C (Step 720) by affecting data block 655. In many embodiments, a device within a data storage system may affect a data block by creating and/or modifying the data block which may be cached throughout the data storage system.

Figure 8:
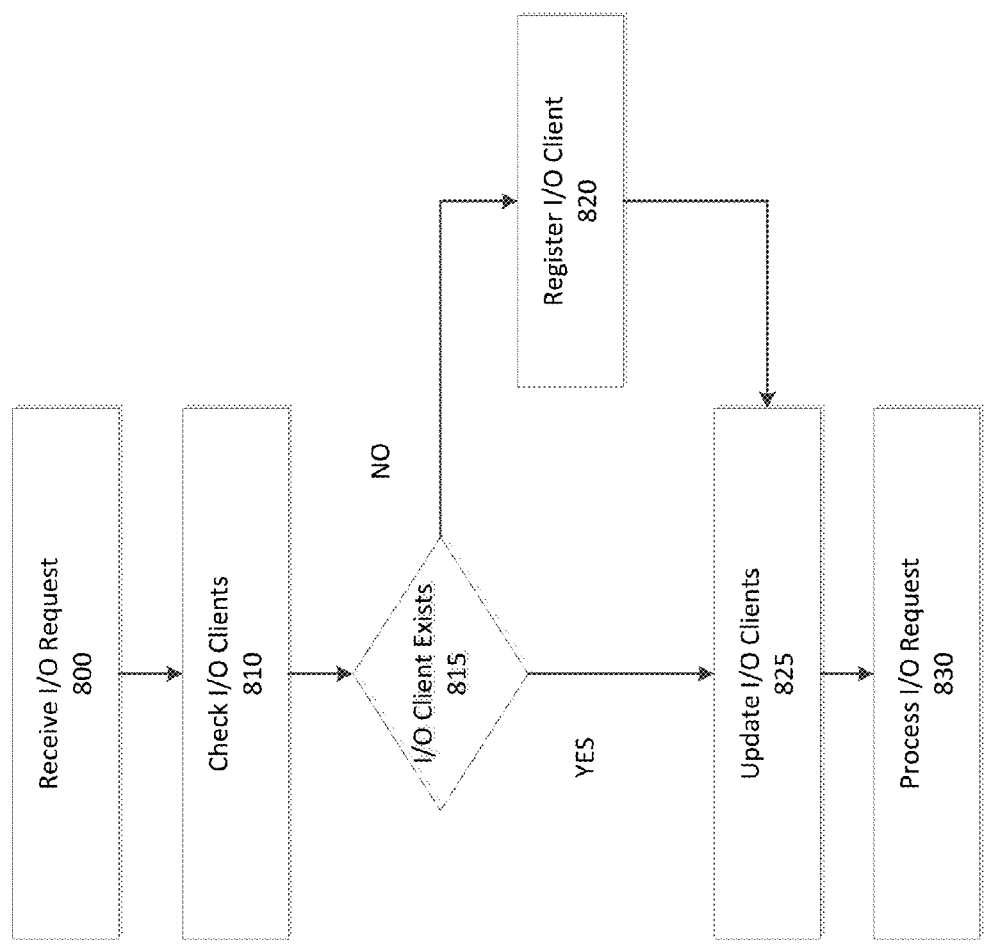
FIG. 8 is a simplified flowchart of a method of managing cache coherency in a data storage system, in accordance with an embodiment of the present disclosure.

Refer to the example embodiment of FIGS. 6 and 8. FIG. 8 is a simplified flowchart of a method of managing cache coherency in a data storage system, in accordance with an embodiment of the present disclosure. As shown, data storage system 600 includes Host 610A, Host 610B, Host 610C, storage appliance 620, and Data storage Array 630. In this embodiment, Host 610A and Host 610C are referencing data block 655.

In this embodiment, Host 610B and Host 610C are referencing data block 655 on data storage array 630. I/O management module 615B is registered with I/O management 625. I/O management module 625 is registered with data storage array 635. I/O management module 615C is registered with I/O management module 635. In this embodiment, host 610A requests to modify data block 655. I/O management module 625 receives I/O request (Step 800) from Host 610A. I/O management module 625 checks registered I/O clients (Step 810) to determine if received I/O request relates to currently registered client (Step 815). As I/O management module 615A is not registered, I/O management module 625 registers I/O management module 615A (Step 820) and updates registered I/O clients (Step 825). I/O management module 625 notifies I/O management 615B that any cached copy of data block 655 will be invalid. I/O management module 625 processes the I/O request (Step 830) by forwarding the request to data storage array 630. I/O management module 635 updates registered I/O clients, in this case I/O management module 615C, and process the I/O request from Host 610A.

Figure 9:
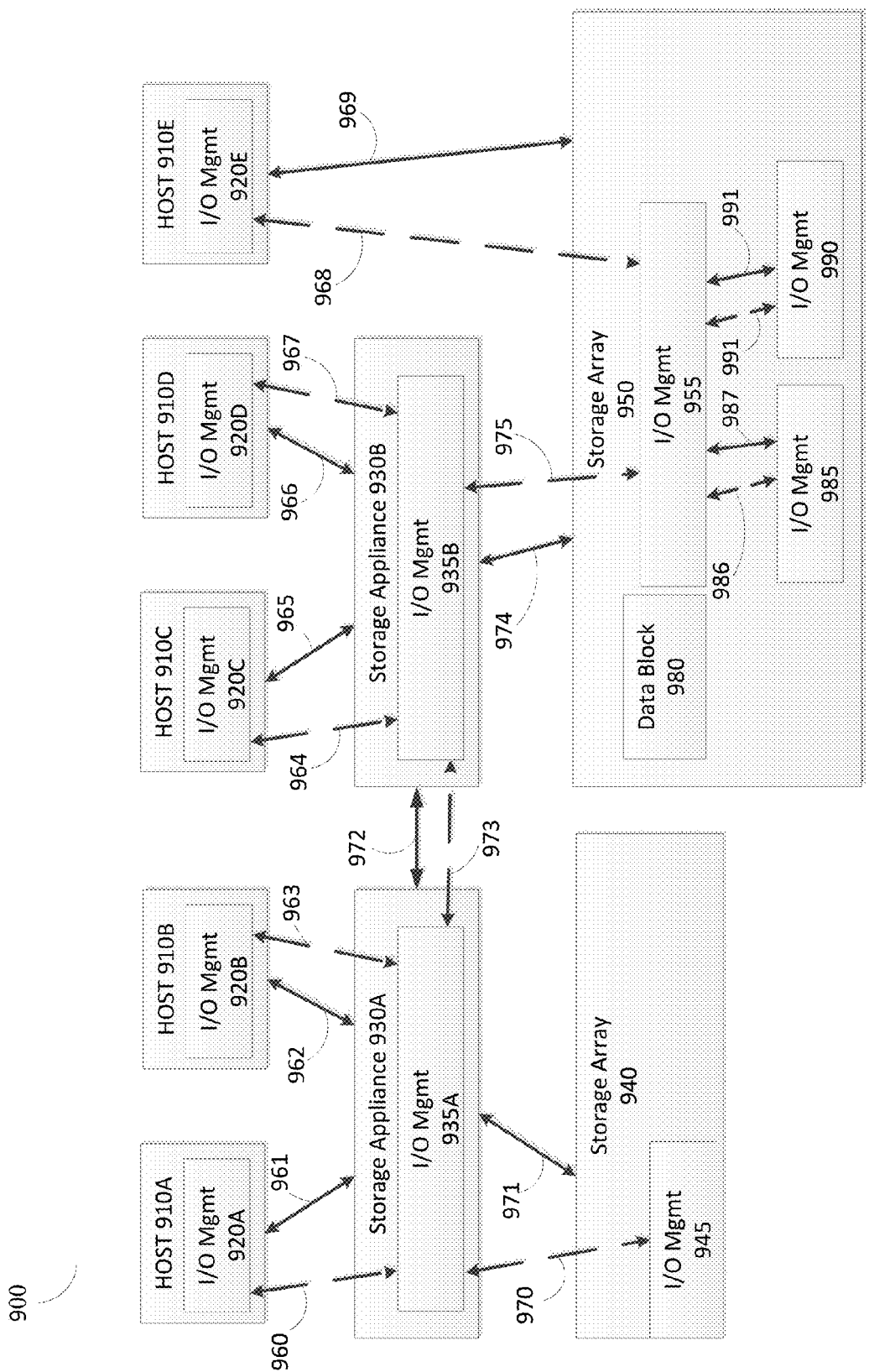
FIG. 9 is a simplified illustration of a configuration of a data storage system using hierarchical cache coherency, in accordance with an embodiment of the present disclosure.

Refer to the example embodiment of FIG. 9. FIG. 9 is a simplified illustration of a configuration of a data storage system using hierarchical cache coherency, in accordance with an embodiment of the present disclosure. As shown, data storage system 900 includes multiple levels of devices. A first level includes Host (910A-E, 910 generally). A second level includes storage appliance 930A and storage appliance 930 B. A third level includes data storage array 940 and data storage array 950. Each level of the data storage system is enabled to maintain cache coherency horizontally or vertically. For example, I/O management module 935 B is enabled to maintain cache coherency with I/O management modules 935A, 920C, 920D.

As shown, command paths 960, 963, 964, 967, 968, 973, 970, 975, 986, 991 enable I/O management modules 920, 935, 945, 955, 985, 990 to communicate. For example, command path 960 enables I/O management module 920A and I/O management 935A to communicate. In this embodiments, data paths 961, 962, 965, 966, 969, 972, 971, 974, 987, 991 enable to each device in data storage system 900 to move data between devices.

In this embodiment, Host 910A and Host 910E are referencing data block 980 on data storage array 950. In this configuration, I/O management 920A is registered with I/O management module 935A. I/O management module 935 A is registered with I/O management module 935B. I/O management module 920E is registered with I/O management module 955. If data block 980 is affected in any way, each registered I/O management module will be notified that data block 980 has changed.

As shown, data storage array 950 includes I/O management modules 955, 985, 990. Data storage array 950 is enabled to utilize I/O management modules 955, 985, 990 to manage I/O to multiple components within data storage array 950. In this embodiment, I/O management module 985 manages a first portion of data storage on data storage array 950 and I/O management module 990 manages a second portion of data storage on data storage array 950. I/O management module 955 is registered on I/O management 985 and uses command path 986 and data path 987 to manage the first portion of data storage. I/O management module 955 is registered on I/O management module 990 and uses command path 991 and data path 987 to manage the second portion of data storage. In many embodiments, multiple instantiations of an I/O management module on a single device may enable management of one or more sub-components on a device.

Figure 10:
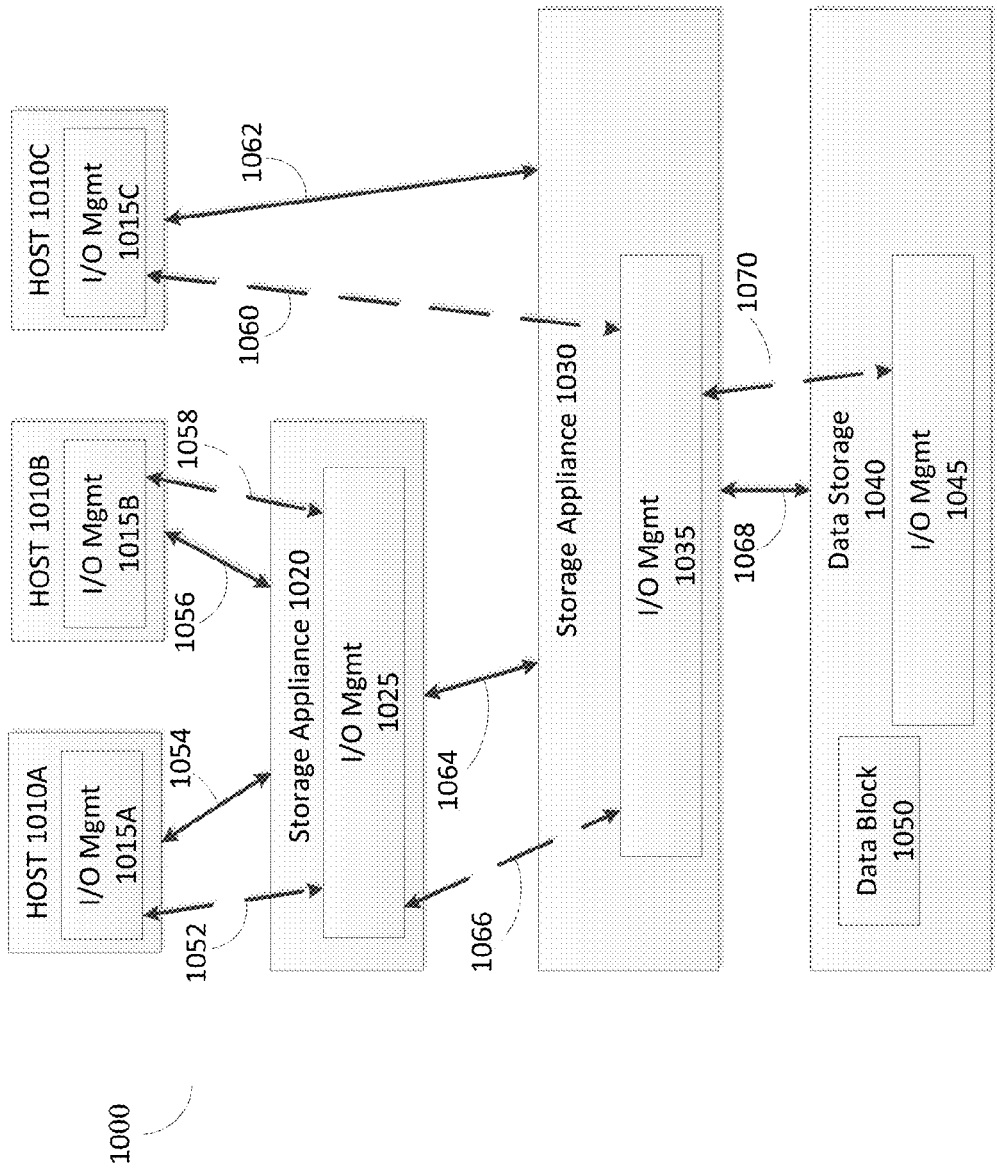
FIG. 10 is an alternate simplified illustration of a configuration of a data storage system using hierarchical cache coherency, in accordance with an embodiment of the present disclosure

Refer to the example embodiment of FIG. 10. FIG. 10 is an alternate simplified illustration of a configuration of a data storage system using hierarchical cache coherency, in accordance with an embodiment of the present disclosure. As shown, data storage system 1000 includes four levels of devices. A first level includes Host 1010A-C. A second level includes storage appliance 1020. A third level includes Server 1030 and a forth level includes Server 1040. In this embodiment, each registered client is enabled to be notified when a data block on data storage array 1040 is affected by a device within data storage system 1000. In many embodiments, a data storage system may be comprised of multiple levels of devices.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 11:
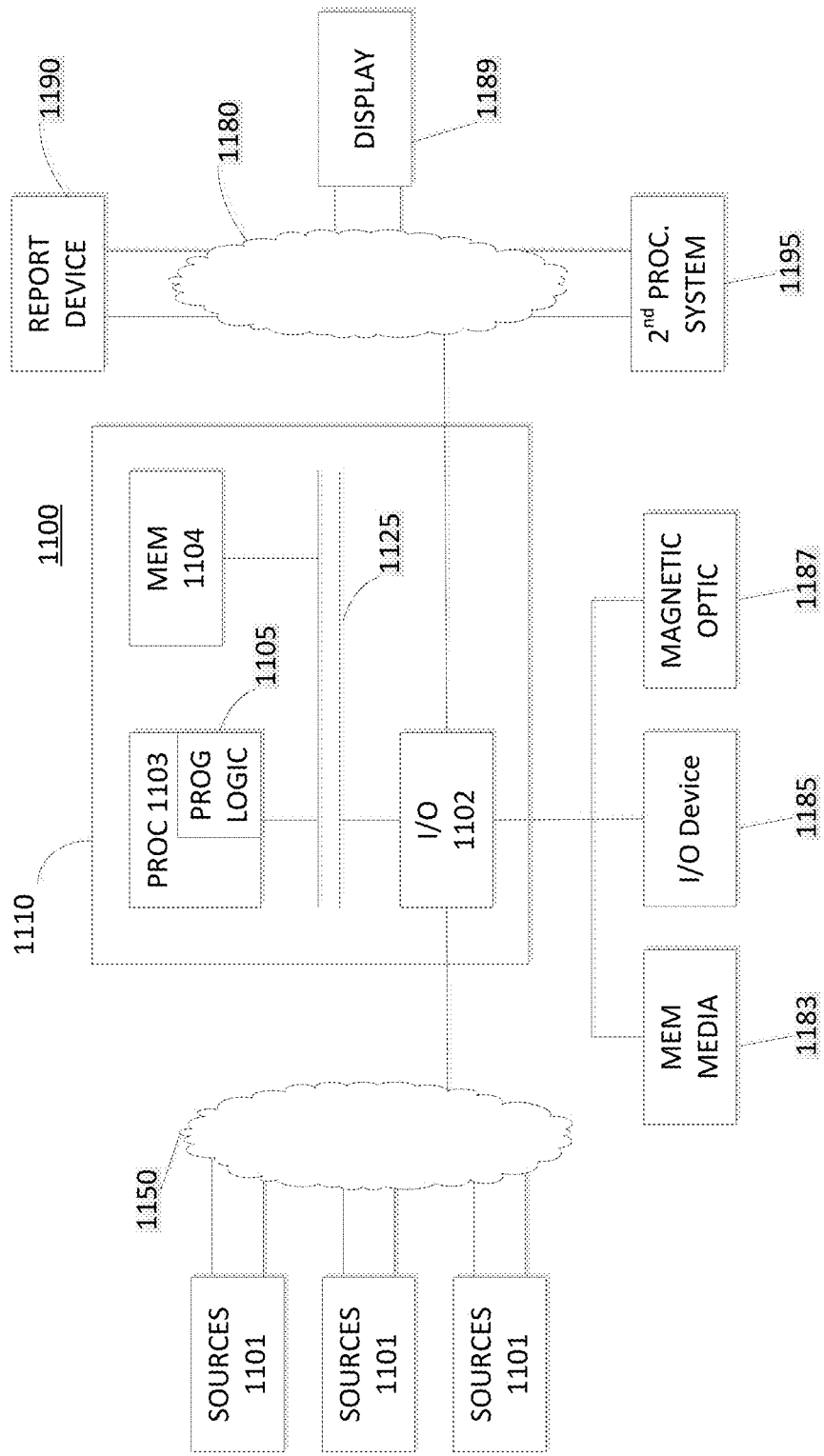
FIG. 11 is an example of an embodiment of an apparatus that may utilize the techniques described herein, in accordance with an embodiment of the present disclosure.

FIG. 11 is a block diagram illustrating an apparatus, such as a computer 1110 in a network 1100, which may utilize the techniques described herein according to an example embodiment of the present invention. The computer 1110 may include one or more I/O ports 1102, a processor 1103, and memory 1104, all of which may be connected by an interconnect 1125, such as a bus. Processor 1103 may include program logic 1105. The I/O port 1102 may provide connectivity to memory media 1183, I/O devices 1185, and drives 1187, such as magnetic or optical drives. When the program code is loaded into memory 704 and executed by the computer 1110, the machine becomes an apparatus for practicing the invention. When implemented on one or more general-purpose processors 1103, the program code combines with such a processor to provide a unique apparatus that operates analogously to specific logic circuits. As such, a general purpose digital machine can be transformed into a special purpose digital machine.

Figure 12:
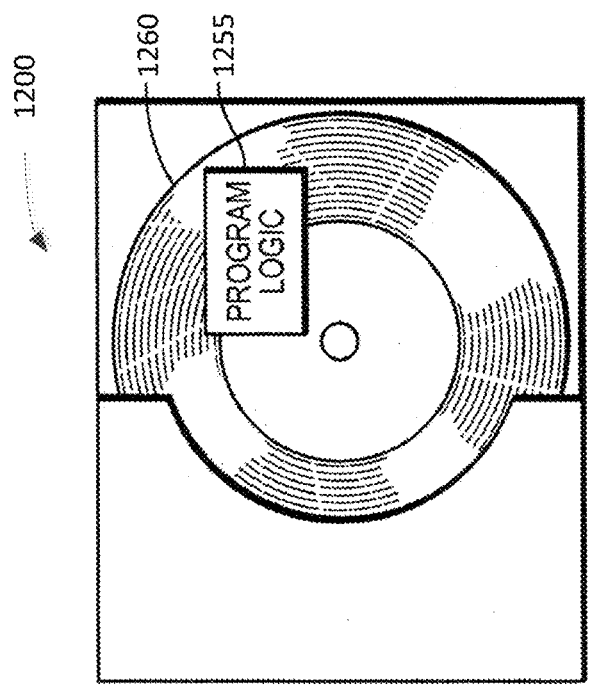
FIG. 12 is an example of a method embodied on a computer readable storage medium that may utilize the techniques described herein, in accordance with an embodiment of the present disclosure.

FIG. 12 is a block diagram illustrating a method embodied on a computer readable storage medium 1260 that may utilize the techniques described herein according to an example embodiment of the present invention. FIG. 12 shows Program Logic 1255 embodied on a computer-readable medium 1260 as shown, and wherein the Logic is encoded in computer-executable code configured for carrying out the methods of this invention and thereby forming a Computer Program Product 1200. Program Logic 1255 may be the same logic 1105 on memory 1104 loaded on processor 1103 in FIG. 11. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-12. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of managing a hierarchical data storage system, wherein the data storage system includes a first level of one or more hosts, a second level of one or more storage appliances, and a data storage array, the computer-executable method comprising:
   receiving an I/O request from a first host of the one or more hosts, wherein the I/O request relates to a portion of data on the data storage array;
   determining a status of the portion of data on the data storage system;
   based on the determination, providing an update to a second host of the one or more hosts based on the I/O request, wherein the portion of data is cached on the second host of the one or more hosts; and
   processing the I/O request by sending the I/O request to the data storage array.

2. The computer-executable method of claim 1, wherein the I/O request is received by a first storage appliance of the one or more storage appliances.

3. The computer-executable method of claim 1, wherein the update directs the second host to stop caching.

4. The computer-executable method of claim 1, wherein the I/O request relates to a request to read a data block on the data storage array that is cached on a first storage appliance of the one or more storage appliances; and
   providing the data block to the first host from the cache of the first storage appliance.

5. The computer-executable method of claim 1, wherein the update includes an invalidate notice indicating that the portion of data cached on the second host is invalid.

6. The computer-executable method of claim 1, further comprising forwarding the I/O request to a first storage appliance of the one or more storage appliances, wherein the first storage appliance is in communication with the data storage array.

7. The computer-executable method of claim 1, wherein upon receiving an I/O request from the first host, determining whether the first host is registered.

8. The computer-executable method of claim 1, further comprising:
   receiving a second update from the data storage array, wherein the second update relates to a second portion of data on the data storage array, wherein the second portion of data is cached on the first host and the second host; and
   providing an update to the first host and the second host.

9. A system, comprising:
   a hierarchical data storage system including:
      a first level of one or more hosts;
      a second level of one or more storage appliances; and
      a data storage array;
   computer-executable logic encoded in memory of one or more computers in communication with the hierarchical data storage system to enable management of the hierarchical data storage system, wherein the computer-executable program logic is configured for the execution of:
      receiving an I/O request from a first host of the one or more hosts, wherein the I/O request relates to a portion of data on the data storage array;

determining a status of the portion of data on the data storage system;

based on the determination, providing an update to a second host of the one or more hosts based on the I/O request, wherein the portion of data is cached on the second host of the one or more hosts; and processing the I/O request by sending the I/O request to the data storage array.

10. The system of claim 9, wherein the I/O request is received by a first storage appliance of the one or more storage appliances.

11. The system of claim 9, wherein the update directs the second host to stop caching.

12. The system of claim 9:

wherein the I/O request relates to a request to read a data block on the data storage array that is cached on a first storage appliance of the one or more storage appliances; and wherein the computer-executable program logic is further configured for the execution of:

providing the data block to the first host from the cache of the first storage appliance.

13. The system of claim 9, wherein the update includes an invalidate notice indicating that the portion of data cached on the second host is invalid.

14. The system of claim 9, wherein the computer-executable program logic is further configured for the execution of forwarding the I/O request to a first storage appliance of the one or more storage appliances, wherein the first storage appliance is in communication with the data storage array.

15. The system of claim 9, wherein the computer-executable program logic is further configured for the execution of wherein upon receiving an I/O request from the first host, determining whether the first host is registered.

16. The system of claim 9, wherein computer-executable program logic is further configured for the execution of:

receiving a second update from the data storage array, wherein the second update relates to a second portion of data on the data storage array, wherein the second portion of data is cached on the first host and the second host; and providing an update to the first host and the second host.

17. A computer program product of managing a hierarchical data storage system, wherein the data storage system includes a first level of one or more hosts, a second level of one or more storage appliances, and a data storage array, the computer program product comprising:

a non-transitory computer readable medium encoded with computer-executable program code for using read signatures in replication, the code configured to enable the execution of:

receiving an I/O request from a first host of the one or more hosts, wherein the I/O request relates to a portion of data on the data storage array;

determining a status of the portion of data on the data storage system;

based on the determination, providing an update to a second host of the one or more hosts based on the I/O request, wherein the portion of data is cached on the second host of the one or more hosts; and processing the I/O request by sending the I/O request to the data storage array.

18. The computer program product of claim 17, wherein the I/O request is received by a first storage appliance of the one or more storage appliances.

19. The computer program product of claim 17, wherein the update directs the second host to stop caching.

20. The computer program product of claim 17, wherein the I/O request relates to a request to read a data block on the data storage array that is cached on a first storage appliance of the one or more storage appliances; and wherein the code is further configured to enable the execution of:

providing the data block to the first host from the cache of the first storage appliance.

\* \* \* \* \*